Jan. 3, 1933. V. COLONNESE 1,892,746
FLOAT STRUCTURE
Filed Jan. 9, 1930
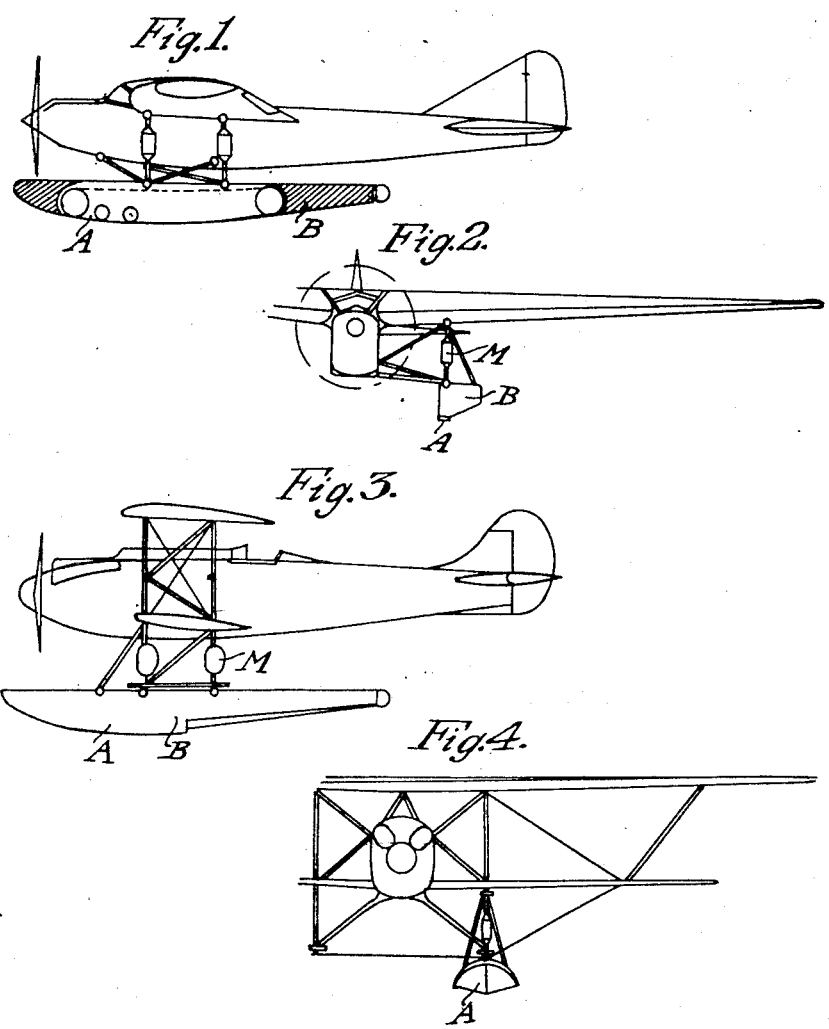

Patented Jan. 3, 1933

1,892,746

UNITED STATES PATENT OFFICE

VITTORINO COLONNESE, OF ROME, ITALY

FLOAT STRUCTURE

Application filed January 9, 1930, Serial No. 419,637, and in Italy January 8, 1929.

This invention relates to aircraft undercarriages designed to permit their alighting on and rising from land as well as water.

Many landing arrangements have been proposed for floats, for example, wheels or endless tracks; but these arrangements, projecting with regard to the float, hindered the starting from the water.

It has also been proposed to provide floats with retractable wheels, but such arrangements require a manœuvre on the part of the pilot, as well as a heavy mechanism for the execution of the retracting and pushing out of the wheels.

It is true that flying boats and seaplanes have previously landed successfully on boggy fields, the floats functioning as skids, but a normal landing of float-fitted airplanes, using floats of standard type without projecting landing members, on hard ground was not possible until my invention.

According to the present invention an undercarriage enabling airplanes to alight on and arise from land as well as water consists of one or more floats, each of which is fitted with a ground landing member in the form of an endless track fitted in a narrow water-tight box in the interior of the float, and preferably in the keel of the float. Each float is resiliently connected with the body of the airplane at at least two points in order to damp the landing shock, and at the same time the float is positively guided in its movement, to prevent the axis of the float from deviating from its proper direction substantially parallel to the axis of the fuselage.

It is already known to provide floats with an anterior resilient rod, but in landing on hard ground it is necessary to provide a greater resiliency, for which I provide at least two resilient members cooperating with a link system retaining the float in its proper direction.

To enable the invention to be more fully understood reference will now be made to the accompanying drawing wherein:

Figure 1 is a side view of an aircraft according to the invention, the undercarriage being shown in the keel line section, and employing an unsymmetrical float;

Figure 2 is a fragmentary side view of the aircraft shown in Figure 1;

Figure 3 is a preferred form of execution, employing symmetrical floats; while

Figure 4 shows a detail of the showing of Figure 3.

As shown in the float section in Fig. 1, in the keel A of the floats B, I provide an antifriction device such for example as an endless friction device such for example as an endless track, or a plurality of rollers. This device is accommodated in a narrow water-tight box extending from the front section of the float touching the ground on landing, to the rear section, employed in rising from the sea. The front section of the keel has a conveniently decided curvature in order to direct the landing shock to the center of gravity of the aircraft. Each float is supported from the aircraft wing by means of a pair of resilient members M and is guided in its movement with regard to the aircraft body by other pivoted but not resilient links, retaining the axis of the float substantially parallel to the axis of the fuselage.

In Fig. 2 is shown how the antifriction device A is arranged in the keel of the float B so that it may act as a skid.

In Figs. 3 and 4 symmetrical floats are illustrated, hinged resiliently to a rod structure of somewhat different construction, which also prevents the floats from swinging in transverse planes and permits movement only in a vertical plane which passes through the axis of the float. In this modification the antifriction device extends along the keel A. It is preferably no broader than the keel, and as shown, is placed in a small chamber, extending from the sharply curved front float section to the rear section behind the float step.

The principal feature of the invention resides in the sharply curved form of the antifriction device in the keel of the float, permitting an infinite number of landing positions, including a steep landing, in which case the curved endless track still fulfills its antifriction function. An additional important feature resides in the fact that in the resilient rod structure of the floats, means are provided which permit movements only in a vertical plane.

What I claim is:

1. In an undercarriage for land and sea planes with resiliently hinged floats and antifriction devices in a small chamber open to the water along a portion of the float keel and having a float step, a decidedly curved endless track extending from the front float section, which touches the ground on landing, to the rear keel section behind the float step.

2. In a land and sea plane, resiliently hinged floats, antifriction devices, a small chamber along a portion of the float keel in which are placed said antifriction devices, means defining a curved antifriction contact surface extending from the front float section to behind the float step, and means for preventing the resiliently hinged floats from swinging in transverse planes, permitting movements only in a vertical plane passing through the float-axis.

In testimony whereof I have signed my name to this specification.

VITTORINO COLONNESE.